UNITED STATES PATENT OFFICE.

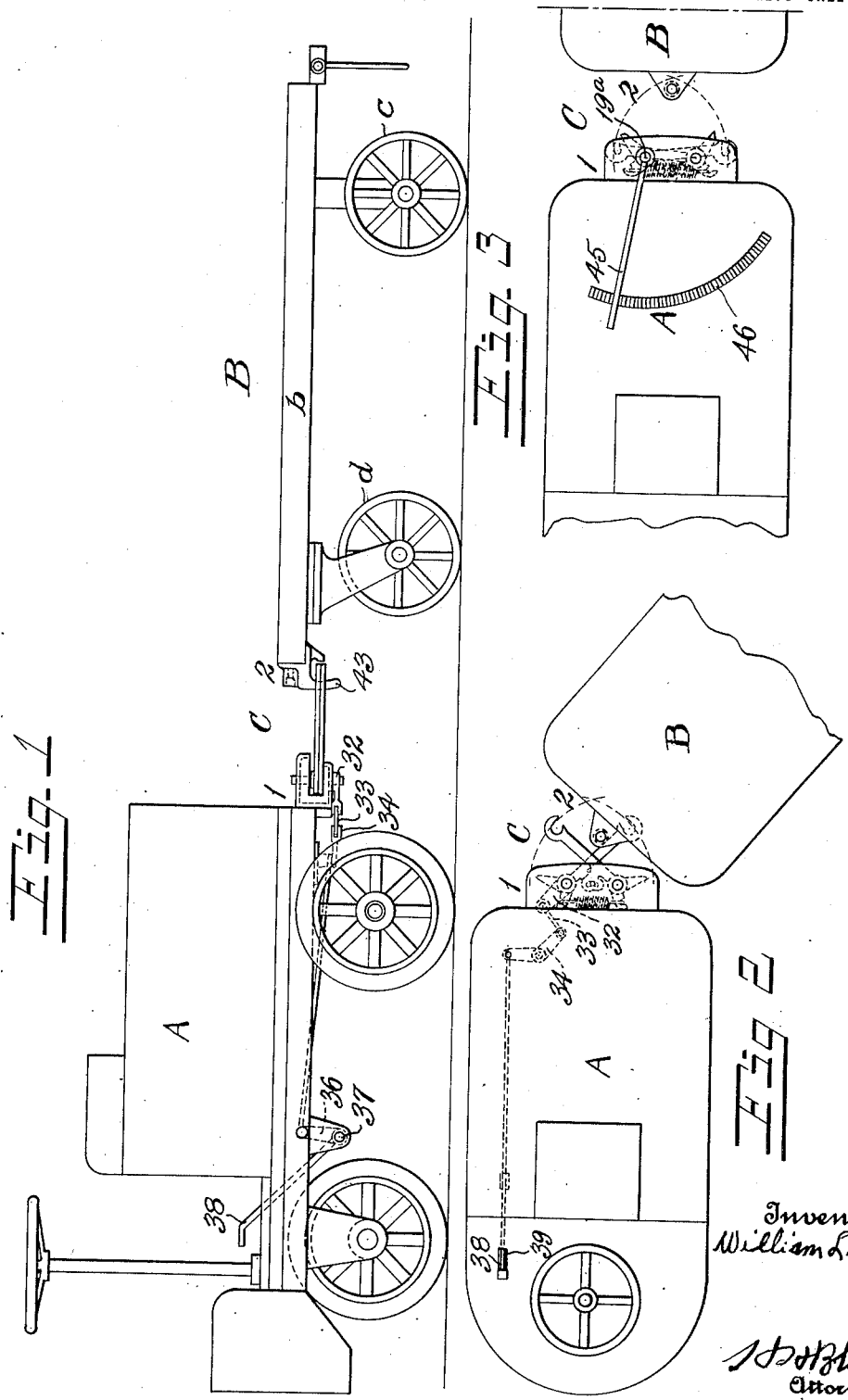

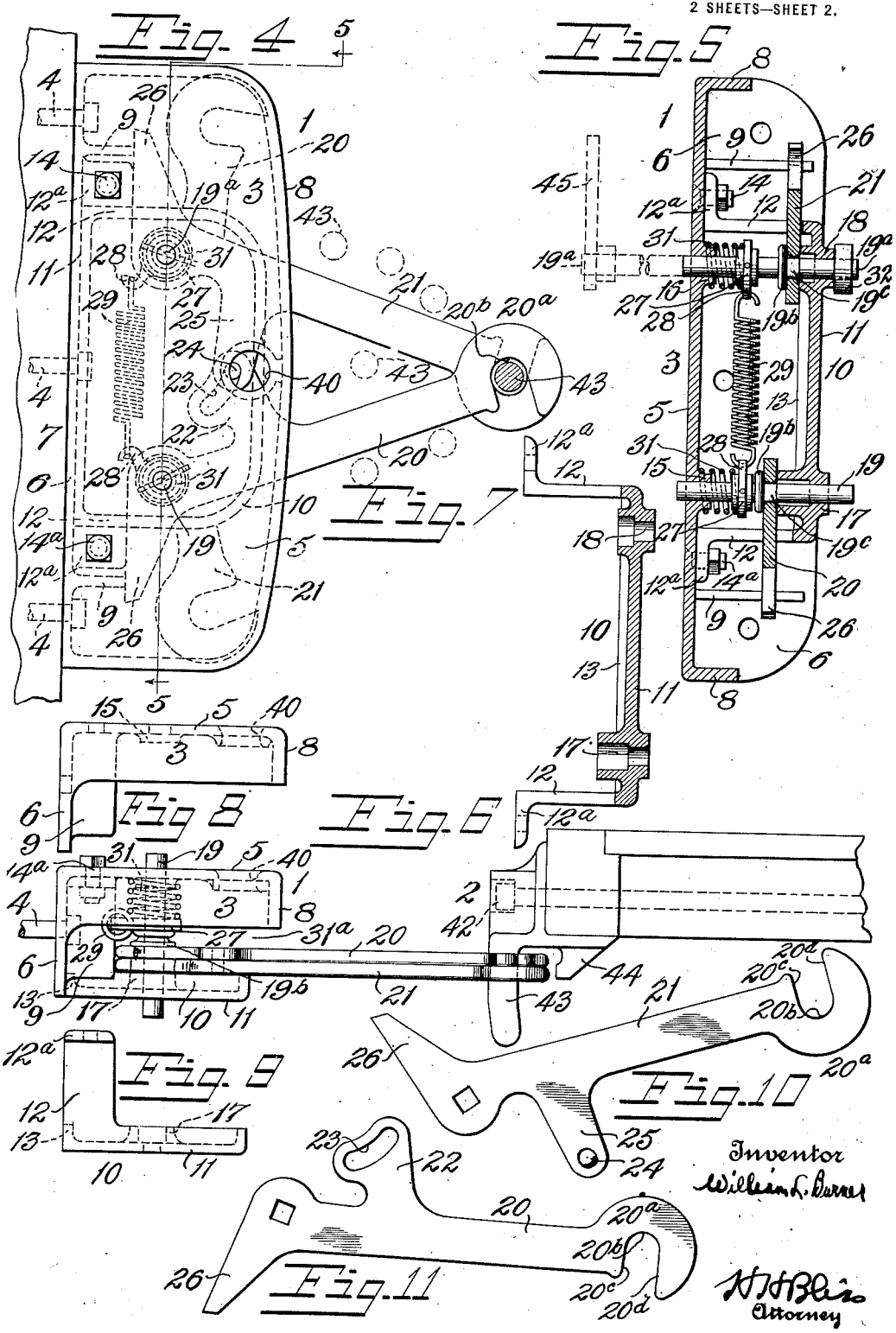

WILLIAM L. BURNER, OF COLUMBUS, OHIO, ASSIGNOR TO THE KILBOURNE & JACOBS MANUFACTURING COMPANY, OF COLUMBUS, OHIO, A CORPORATION OF OHIO.

TRUCK-COUPLING.

1,375,775.            Specification of Letters Patent.      Patented Apr. 26, 1921.

Application filed August 23, 1919. Serial No. 319,411.

*To all whom it may concern:*

Be it known that I, WILLIAM L. BURNER, a citizen of the United States, residing at Columbus, in the county of Franklin and State of Ohio, have invented certain new and useful Improvements in Truck-Couplings, of which the following is a specification, reference being had therein to the accompanying drawing.

This invention relates to improvements in coupling devices for trackless vehicles, particularly in coupling devices for connecting tractors to the trailers or trucks that are to be drawn thereby. The mechanism embodied in my improvements is especially advantageous when combined with the vehicles used in and around railroad stations for transporting baggage, mail bags, and the like, and in warehouses, machine shops and similar places.

Heretofore difficulty has been experienced in quickly and readily coupling a truck to a trailer or train of trailers because of the fact that the trucks have been so made that, preliminary to coupling them, it has been necessary to bring the coupling device on the relatively approaching vehicles to approximate alinement. It has also been necessary either for the driver to leave his seat to effect the coupling or uncoupling of the vehicle, or to have a second attendant for this purpose.

One object of the invention is to provide the tractor and the truck or the trailer to be coupled thereto with coupling devices such that they can be coupled when positioned in any of a wide range of angles, and avoid the necessity of preliminarily bringing them to alinement. Another object is to provide a coupling which can be operated by the tractor operator without leaving his seat. Another object is to provide devices of this sort which are simple in construction, strong, and durable, which can be relied on with an assurance of their being always operative and which will require but little attention during their operation. And another object is to so construct the parts of the coupler that they can be attached to any tractor or truck of the ordinary sort.

Figure 1 is a side elevation of a tractor and self-propelled truck and of a trailer equipped with coupling devices embodying my improvement.

Fig. 2 is a diagrammatic plan view of parts shown in Fig. 1, and illustrating the method of coupling when the vehicles are out of alinement.

Fig. 3 is a diagrammatic plan view showing a modification in the controlling devices for the coupler.

Fig. 4 is a plan view on a larger scale of one of the elements of the coupling devices.

Fig. 5 is a vertical section on the line 5—5 of Fig. 4.

Fig. 6 is a side elevation of the parts in Figs. 4 and 5.

Fig. 7 is a vertical section of the lower supporting element detached.

Fig. 8 is an end view of the casing.

Fig. 9 is an end view of the lower supporting element.

Figs. 10 and 11 are plan views of the coupler hooks detached.

In the drawings, A represents, more or less conventionally, a tractor or self-propelled vehicle. It may be one of any of the sorts commonly used in and around railway stations and warehouses to haul one or more trailer vehicles. B represents such a trailer which may be one of any of the ordinary sorts. As shown, it has a body, $b$, mounted upon fixed wheels, $c$, and a caster wheel, $d$, the latter permitting the end of the body to readily swing laterally. C indicates as an entirety the improved coupling for connecting the tractor and the trailer together. It comprises the two elements, 1 and 2, secured, respectively, to the tractor and to the trailer to be joined thereto.

The element 1 comprises a base structure adapted to be secured to the central part, transversely of the end of a vehicle by bolts 4, and having an upper section, and a lower section, and carrying the relatively movable devices of the coupler.

The upper part or section 3, preferably a casting, has a flat top or cover 5 and a vertical plate 6, adapted to lie flat against the end of the vehicle frame 7, and a flange 8 projecting downward from the cover and extending around its edge.

9, 9 are vertically positioned webs extending down from the top 5, and for a purpose to be described. 10 indicates the lower section of the base, it having the bottom plate 11, vertical walls 12 and flanges $12^a$ and 13, the former fitting against the under surface of the cover 5 and the latter against the surface of the back plate 6. Bolts 14 and $14^a$ hold the bottom section 10 rigidly in place.

15, 16 indicate bearings integral with the plate 5, and 17, 18 indicate bearings integral with the bottom plate 11, to hold vertical shafts 19 and 19$^a$. Each of these shafts has a rigid collar 19$^b$, and below this collar it is square in cross section, as at 19$^c$, the parts fitted in the bearings being circular.

20 and 21 indicate the coupling bars of the element 1. The arm 20 is horizontally oscillatable around the axis of the shaft 19, the shaft passing through an aperture in the arm which allows slight vertical play, but is square to fit and receive motion from the shaft. The arm 21 is similarly connected to the shaft 19$^a$. Arm 20 has a lateral horizontal projection 22 in which there is formed an arcuate slot 23. The arm 21 has a lateral projection 25 carrying a pin 24, which is so positioned as to pass through the slot 23. When either arm is moved the pin and curved edges of the slot impart similar movement to the other. Each arm is at its inner end, beyond its axis, formed with a short extension or lug 26 which in connection with a web 9 serves as a stop to limit the swing in one direction. In the other direction each of the arms can swing toward the vehicle far enough to have its outer end carried entirely into the box or housing provided by the base. The shafts are connected together by a spring 29, whose ends are secured to hooks 28, projecting from collars 27, which are rigidly secured to the shafts. Each shaft is also provided with a spring 31 arranged to bear downward upon its collar 27 and upward against the cover plate 5. These springs 31 tend to force the shafts 19 and 19$^a$ downward and cause the collars 19$^b$ to bear upon the upper surfaces of the arms 20 and 21 and maintain them, normally, in horizontal planes. But, at the same time, the springs permit the shafts and the collars 19$^b$ to yield upward when the outer ends of the arms are caused to move up or down, as under the vertical swayings of the vehicles. There is an open space at 31$^a$ below the flange 8 of the casing (see Fig. 6), which allows for oscillation vertically of the arms. The outer ends of the arms are substantially similar. Each is shaped to provide a hook-like extremity 20$^a$. In the extremity there is formed a socket or recess 20$^b$, the side edges 20$^c$, 20$^d$ of which flare slightly to insure that the holder lug will readily enter. The edge 20$^d$ is considerably longer than the edge 20$^c$, to prevent escape of the coupling lug, in case of lateral jars or jolting of the vehicle, or undue yielding of the spring 29.

When the arms are both in their operative positions the inner ends of the socket recesses 20$^b$ constitute a passageway which is closed or surrounded by metal on all sides.

The arms are brought, or permitted to move, from one of their extreme positions, as that in dotted lines in Fig. 4, to the other, as that in full lines of said figure, by manually controlled devices. The shaft 19$^a$ is extended downward sufficiently far below the base to permit the securing thereto of a crank arm 32. This is connected by a link 33 to one arm of a bell lever 34, the other arm being pivoted to a link which at its forward end is connected to a crank 36, to the shaft 37 of which is secured a foot lever 38 accessible to the driver when in his seat on the tractor. The foot lever and all of the parts in the train of devices controlled thereby can be locked in the desired position by means of a ratchet and dog at 39, or in any other suitable way.

40 is an aperture in the cover part 5, to permit access to the slot and pin at 23, 24 for cleaning them or for lubrication.

The counterpart element 2 of the coupling is secured to the central part of the end portion of a vehicle by a bolt 42. It has a downwardly extending holding lug or pin 43 adapted to be engaged by the arms 20, 21 of the coupler element 1. This holder 43 has a cross section such that it can fit snugly, though somewhat loosely, in the sockets in the ends of the arms. To guard against the arm ends being thrust inward under the vehicle which carries the holder 43, I prefer to combine with the main lug a supplemental shorter lug 44; and to cast the two lugs and the base plate integrally together. At times it is desirable to join a vehicle like that at B to another by a coupler of modified form, metallic loops being frequently used. In such case the lug 43 receives the draft strain, and that at 44 serves as a stop against displacement and also as an abutment to receive inward thrust.

The manner in which the devices can be operated will be readily understood. Assume that the operator desires to couple the tractor A to the trailer B. He causes the former to approach the trailer; and because of the construction and the arrangement of parts shown and described the two vehicles can be brought together along widely angulated paths. That is to say, it is not necessary to get them into positions approximating alinement. As shown by dotted circles in Fig. 4 the tractor and trailer may be positioned relatively to each other to have the coupler pin 43 positioned anywhere within the area traversed by the outer edges of the arms 20 and 21 as they swing outward, and the pin will necessarily be finally moved into the sockets 20$^b$.

If it be further assumed that the arms 20 and 21 on the tractor are locked in their positions within the casing, as in Fig. 4, the operator releases the dog or holder of lever 38 and thereupon the spring begins to immediately swing the arm 21 outward from the casing; and the pin 24 in slot 23 causes a simultaneous and equivalent movement of the arm 20. This outward movement of the arms continues until one of them impinges upon the coupler pin 43. Almost invariably, the relative positions of the vehicles will be such that at the time an arm contacts with the pin the latter will be (as in Fig. 2) in some position such that its vertical lines will be remote from the central vertical longitudinal plane of the vehicles. Therefore, it will be engaged by the side edge of one of the arms at a point inside of the socket recesses 20$^b$. The operator, without paying any attention to this, starts the tractor forward immediately after releasing the arms; thereupon the contacting arm will slide along the pin; and, at the same time, the force from the spring 29 will cause the arm to press the pin laterally, and the movement from this may amount to a swinging laterally of the end of the vehicle. As the two movements progress the pin finally reaches the recess 20$^b$ in the hook ends of the arms, and the latter instantly assume their ultimate locked position where they are held by the spring 29. When the operator desires to uncouple the vehicles he merely pushes on the foot lever until he again brings the arms 20 and 21 into their positions within the housing (dotted lines Fig. 4,) the vehicles being thereby disconnected.

The outer arms 20 and 21 cannot, by accident or inadvertence, pass each other, the stop arms 26 impinging on the stops 9 at the instant when the socket recesses 20$^b$ reach the central line of the vehicle.

In Fig. 3 a modification is shown of the arm controlling device. Here one of the shafts, as at 19$^a$, is extended up to a plane high enough to permit the attachment of a lever 45, the latter being long enough to be reached by the operator. This lever can be locked at any point in its range by means of a detent and ratchet, as at 46, or in equivalent manner.

What is claimed is:

1. The herein described coupler element, in a mechanism for joining vehicles together, having parts adapted to engage with a vertically extending holder secured to a vehicle, and comprising two horizontally movable arms, vertical hinging devices for the arms, a support for the hinging devices secured to a vehicle, and means supplemental to the hinging devices connecting the arms for equalizing their movements, each arm having its axis positioned on one side of the center of the vehicle and adapted to swing across the center to a transverse position and both adapted to have their free ends swing outward to the vertical lines of the aforesaid holder lug.

2. The herein described coupler element, in a mechanism for joining vehicles together, it having two horizontally movable arms for engaging with a vertically extending holder secured to a vehicle, in combination with hinging devices for the arms, a relatively short support for the hinging devices secured to a vehicle, each arm having its axis at one side of the center of the vehicle and its free end positioned, when folded, at the other side of said center and both adapted to have their free ends swing outward from the vehicle to the vertical lines of the aforesaid holder lug, and means for optionally swinging the arms away from their operative position to their folded position.

3. The herein described coupler element, in a mechanism for joining vehicles together, it having two horizontally movable arms adapted to engage with a vertically extending holder secured to a vehicle, a base which is transversely short for supporting said arms, each arm being hinged at an axis on one side of the center of the vehicle and adapted to swing across said center to folded position, the two hinges being on opposite sides of the center, and the outer edges of the arms being adapted to impinge upon a holder such as aforesaid on another vehicle and to slide along the same to a predetermined point on the arm, and means for holding the arms in positions where one of said edges can impinge upon a holder on another vehicle prior to the arms moving to their operative position.

4. The herein described coupler element, in a mechanism for joining vehicles together, it having two horizontally movable arms adapted to engage with a vertically extending holder secured to a vehicle, hinging devices for the said arms, a support for the hinging devices secured to a vehicle, means for applying power to one of said arms to swing it, and a power transmitter connecting the arms, the arms being foldable to approximately transverse lines when idle and adapted to swing outward from the vehicle to their operative positions.

5. The herein described coupler element, in a mechanism for coupling vehicles together, it having two horizontally movable arms adapted to engage with a vertically extending holder secured to a vehicle, a holder for the arms secured to a vehicle, the arms being hinged oppositely in relation to the center of the vehicle and each hinged on one side of said center and adapted to swing to folded position across the said center and also adapted to have its outer edge impinge on a holder such as aforesaid when said holder is positioned at either of several vertical lines at the sides of the central vertical plane of the vehicle.

6. The herein described coupler element in a mechanism for joining vehicles together, it having two horizontally movable arms adapted to engage with a vertically positioned holder secured to a vehicle, in combination with a support for said arms secured to a vehicle, said arms being foldable to approximately transverse lines in front of the rearmost transverse vertical planes of the support and to swing outward beyond the said rearmost transverse planes to positions of engagement with a holder such as aforesaid, and a spring normally acting to move said arms to said positions of engagement.

7. In a mechanism for joining vehicles together, one of which is provided with a vertically extending coupling holder, a base structure adapted to be secured to another vehicle, a horizontally movable arm pivotally connected to the base at an axis on one side of the central vertical longitudinal plane of the vehicle, and adapted to swing around said axis across said plane to an approximately transverse position behind the outermost transverse vertical plane of the base and also to swing outward from the base, said arm having a socket at its free end adapted to detachably engage with said vertically extending holder on the other vehicle.

8. The herein described coupler element, in a mechanism for joining vehicles together, said element being adapted to engage with a vertically extending holder lug secured to a vehicle, and comprising two horizontally movable bars, each held by a vertical pivot supported on a vehicle and positioned on one side of the central vertical longitudinal plane of the vehicle, and adapted to have its outer end positioned on the other side of said plane when out of operation, and to swing toward and from said plane, each bar having a recess normally situated in the said plane to engage with the said holder lug, in combination with means for positively moving the outer ends of said bars away from said plane.

9. The herein described coupler element, in a mechanism for joining vehicles together, adapted to engage with a downward projecting holder secured to the end of a vehicle, said element comprising two arms, each having a socket to receive the said holder, said sockets being on the outer sides of the said arms, a spring normally positioning the said arms to have their sockets in vertical alinement, and stops for the arms, respectively, preventing the socketed ends from swinging beyond the position of said alinement.

10. The herein described coupler element, in a mechanism for joining vehicles, adapted to engage with a vertically disposed holder secured to the end portion of a vehicle, said element comprising a casing adapted to be secured to the end part of a vehicle, two horizontally swinging arms having sockets in their outer ends adapted to oppositely engage with a holder such as aforesaid, and also adapted to be moved into and be covered by said casing, and the spring normally tending to move the arms out from the casing to their operative position.

11. The herein described coupler element, in a mechanism for joining vehicles together, having parts adapted to engage with a vertically extending holder secured to a vehicle, and comprising a housing with a lateral opening and two horizontally swinging bars each pivoted to the housing at one side of the center of the vehicle and adapted to swing backward across the center into the housing and both adapted to have their outer ends swing forward to the vertical lines of the aforesaid holder lug.

In testimony whereof, I affix my signature.

WILLIAM L. BURNER.